TELEPHONE SWITCH MECHANISM

Filed May 26, 1954 3 Sheets-Sheet 1

INVENTORS.
PHILIP N. LEHR &
GEORGE W. O'BRIEN
BY
Campbell, Brumbaugh, Free & Graves
Their ATTORNEYS Aug. 13, 1957 P. N. LEHR ET AL 2,802,904

TELEPHONE SWITCH MECHANISM

Filed May 26, 1954 3 Sheets-Sheet 2

INVENTORS.
PHILIP N. LEHR &
GEORGE W. O'BRIEN
BY
Campbell, Brumbaugh, Free & Graves
Their ATTORNEYS.

TELEPHONE SWITCH MECHANISM

Filed May 26, 1954 3 Sheets-Sheet 3

INVENTORS.
PHILIP N. LEHR &
GEORGE W. O'BRIEN
BY
Campbell, Brumbaugh, Free & Graves
their ATTORNEYS United States Patent Office 2,802,904

Patented Aug. 13, 1957

2,802,904

TELEPHONE SWITCH MECHANISM

Philip N. Lehr, Huntington, and George W. O'Brien, Merrick, N. Y., assignors to Dictograph Products Company, Inc., Jamaica, N. Y., a corporation of Delaware Application May 26, 1954, Serial No. 432,467

13 Claims. (Cl. 179—99)

This invention relates to telephone switch mechanisms, and has particular reference to gang switch arrangements whereby the operation of any one of the switches may be made either dependent upon or independent of operation of other switches.

At a telephone from which a call originates it is frequently desirable to close two or more switches either at the same time or sequentially in order to place a corresponding number of called telephone instruments in simultaneous operation or to initiate their operation, for purposes of multi-call signalling, announcing, and the like. Such would be the case, for example, in a so-called executive telephone where multi-connections would be essential. In other situations, such for example as staff telephones, it is desirable that the mechanism be used only for one call operation.

In a preferred embodiment of the invention, the switch latch bar which normally holds a switch in actuated position is connected by a unidirectional lost motion coupling to a shaft journalled in a swinging bracket pivoted on the station frame and connected to the release lever for simultaneously restoring the actuated switches to open position. Any number of switches or banks of switches may be connected to the bracket in the same way, with the lost motion coupling enabling any number of switches to be closed without affecting other switches or other banks. The opening of the closed switch or switches is carried out through a control which actuates all of the switch latch bars simultaneously so that all of the closed switches are simultaneously restored to open position. In certain cases the simultaneeous restoring action for one or more closed switches can be effected by the replacement of the telephone handset of the calling station in its cradle after the single or multiple calls have been completed. In other cases it can be effected by a separate control lever.

If desired the unidirectional lost motion coupling can be eliminated between the latch bars and the swinging bracket, in which case the closing of any one switch is made to release all other switches which might have been closed.

It will be seen that the telephone gang switch mechanism of this invention increases the utility and flexibility of an intercommunicating telephone system by adding to it in a simple way, the advantages of monitoring, multi-call, announcing and other collective or group communication, without rendering it incapable of adaptation to single call service.

For a more complete understanding of the invention, reference may be had to the accompanying drawings, in which:

Figure 1 is a side view of the chassis frame of an intercommunicating telephone station equipped with the gang switching mechanism of this invention;

Fig. 2 ilustrates in perspective, a switch bank equipped with the gang switching mechanism of the invention;

Figures 1, 6:
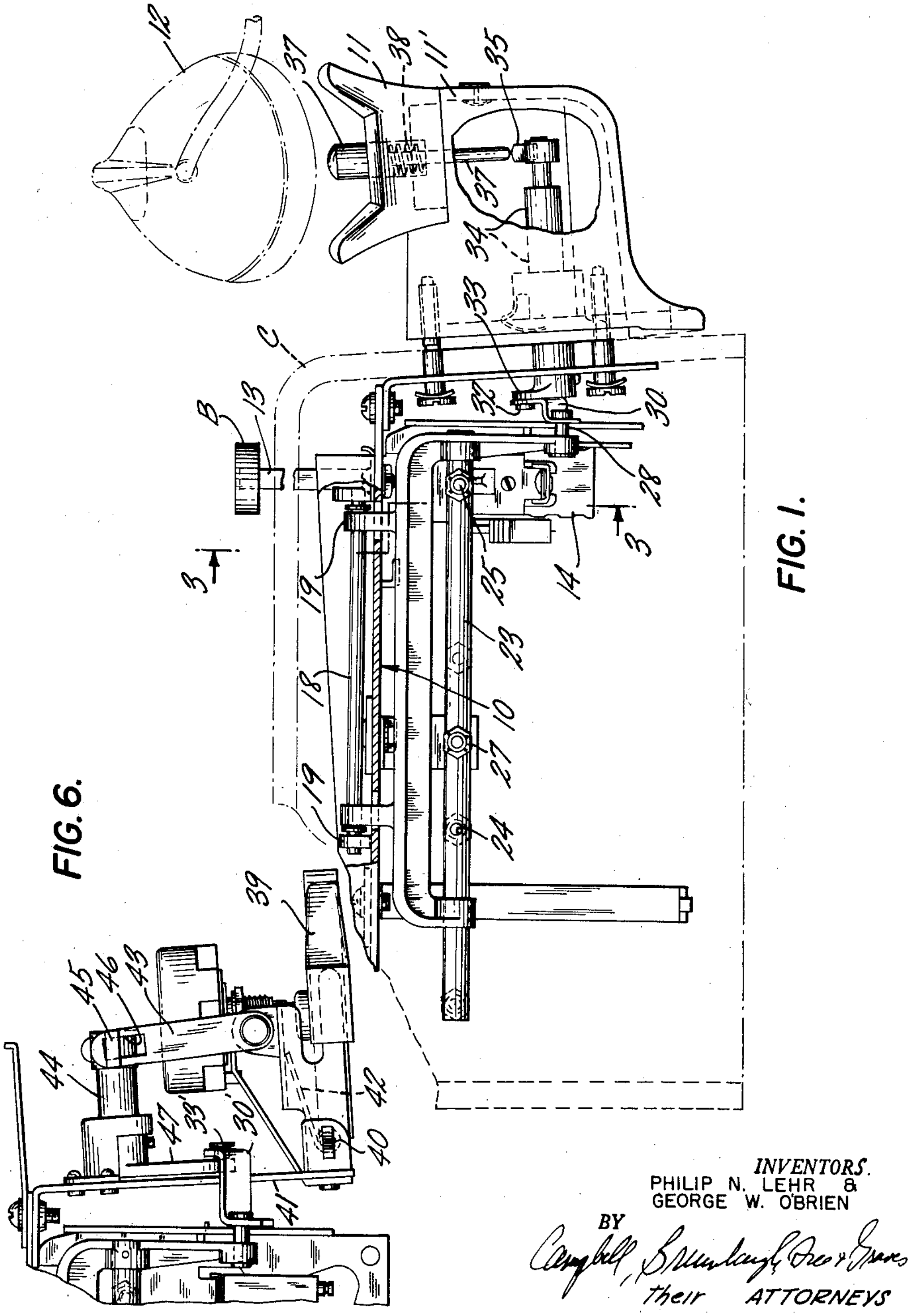
Fig. 6 is a side view of a modified switch release assembly which can be substituted for the right hand portion of Fig. 1.

Referring to the drawings, the chassis of an intercommunicating telephone station of the general type illustrated by Design Patents Nos. 165,016 and 165,017, for example, is shown, but in the interest of clarity, exterior details of the station are not shown. The mounting plate 10 of the chassis carries the operating parts of the station, including the cradle 11 for the telephone handset 12 located outside of the casing C indicated in phantom in Fig. 1. The individual switches 13 extend upwardly through the top of the casing C and are fitted with push buttons B, also shown in phantom in Fig. 1. It will be understood that the details of such coordinate operating devices as the lock-out relay R of Figs. 3 and 4, visual indicators (not shown), and the like, are not part of the present invention, and therefore, are not shown in detail, although reference may be had to Patent No. 2,003,689 for general details thereof.

Figure 2:
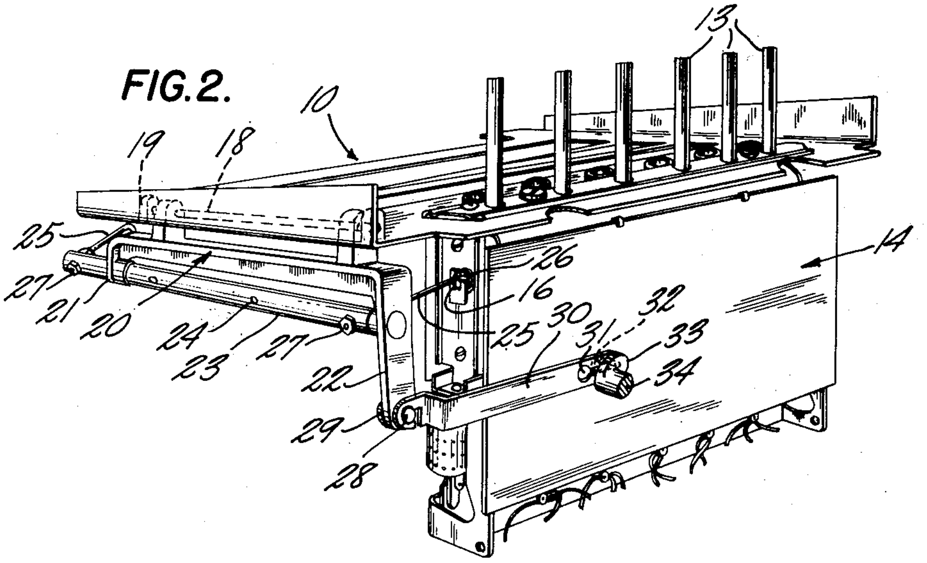

One of the switch banks 14, shown particularly in Fig. 2, is of conventional construction and contains the usual switching mechanism to which the switches 13 are connected. It will be understood that two or more switch banks 14 may be mounted side by side and secured on the underside of the mounting plate 10 in the usual way.

Figure 3:
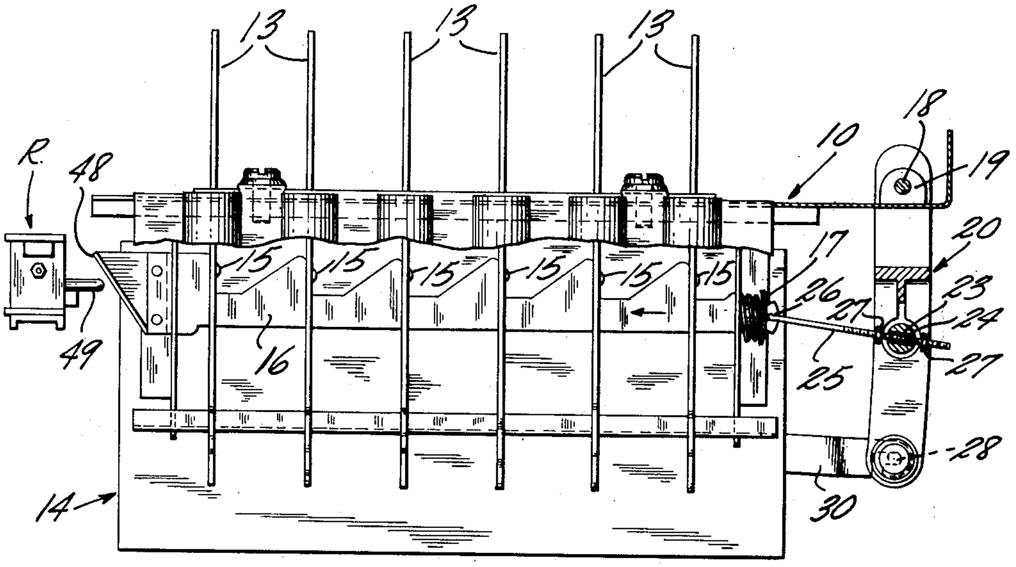
Fig. 3 is a view in vertical section through a switch bank as seen along the line 3—3 of Fig. 1, and illustrates one connection between the gang switching mechanism and the release mechanism for one bank of switches.

As shown especially in Fig. 3, the switches 13 are slotted or notched for the reception of the corresponding tongues 15 of the switch latch bar 16 and the tongues 15 are so shaped that as one of the switches 13 is depressed to initiate the calling circuit, the corresponding tongue 15 cams switch latch bar 16 to the left in the direction of the arrow against the pressure of spring 17. The corresponding tongue 15 then drops into the notch or slot of the depressed switch 13 and spring 17 thereupon returns switch latch bar 16 to the right hand position shown in Fig. 3 to hold the depressed switch 13 in closed position.

Pivoted on a horizontal shaft 18 extending between lugs 19 on the upper surface of mounting plate 10 is an inverted U-shaped bracket 20 between whose depending arms 21, 22, is journalled a rod 23 having a series of spaced transverse holes 24, one opposite each switch bank 14. Passing loosely through hole 24 is a link 25 having, in the arrangement of Figs. 2 and 3, a hook 26 at one end which is inserted in a hole in the end of the corresponding latch bar 16. The link 25 is threaded at its other or outer end which passes through hole 24 in the rod 23 to which it is secured by nuts 27. By providing two nuts 27 the length of link 25 may be adjusted to accommodate variations in the spacing of the corresponding latch bars 16 from the rod 23 and the oversized holes 24 therein accommodate variations in the relative angular positions of the links 25. As stated, one link 25 may be provided for each switch bank 14, although the latch bar 16 of each switch bank is not necessarily connected to the rod 23 by a corresponding link 25. Nevertheless, a hole 24 is provided in rod 23 for each switch bank, so that its latch bar 16 may be connected by a link 25 to rod 23 whenever that is required.

Figures 4, 5:
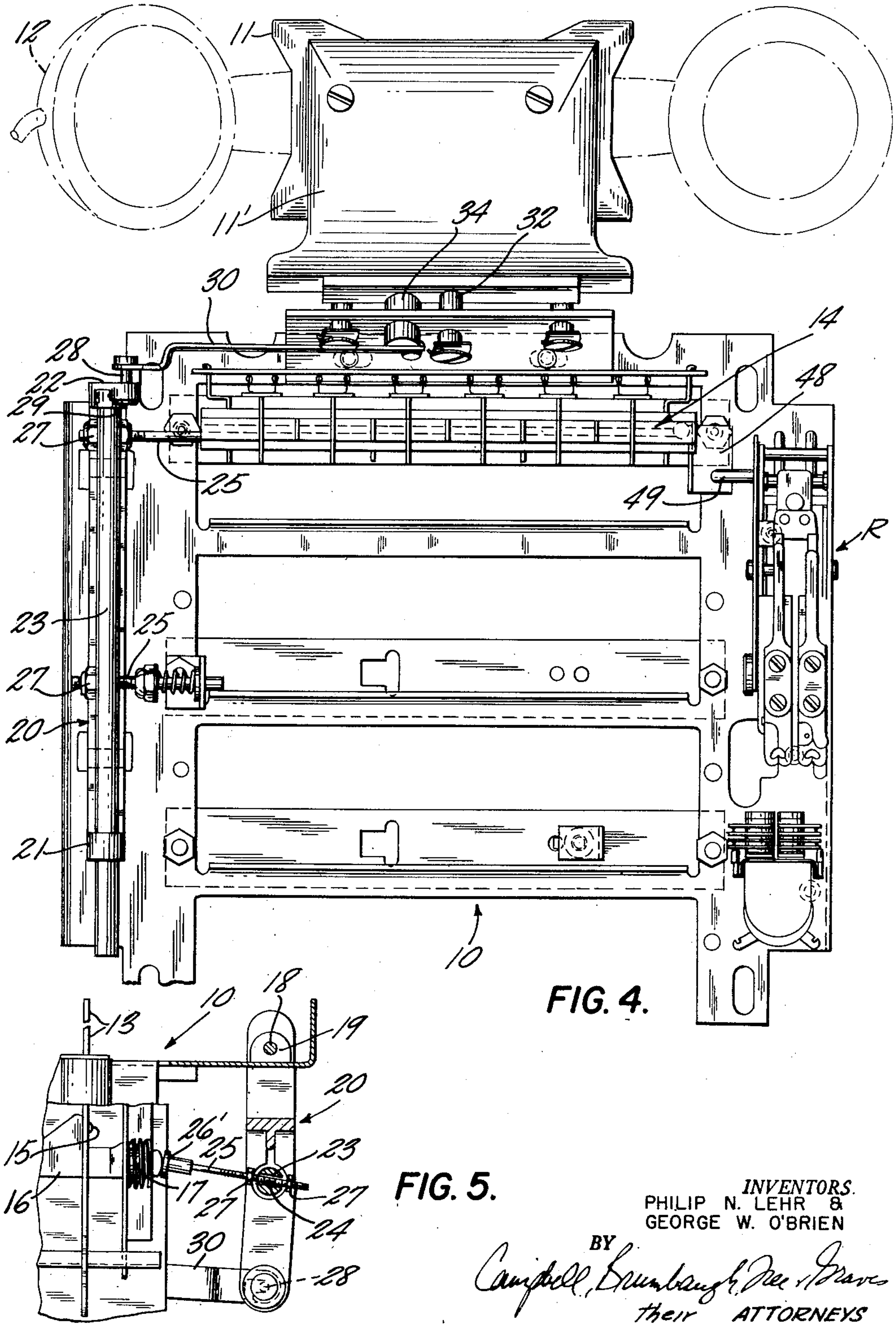
Fig. 4 is a bottom view of the chassis frame shown in Fig. 1.
Fig. 5 is a view in vertical section through one end of a switch bank as seen along the line 3—3 of Fig. 1 and corresponding to the right hand end of Fig. 3 but showing a modified connection between the gang mechanism and the release mechanism.

In the arrangement of Fig. 5, in which like parts are identified by like reference numerals, the link 25 is formed on its free or left hand end with a pushing head 26′ which is adapted to push against the latch bar 16 in lost motion coupling. Thus the latch bar is free to be moved to the left without pulling the bracket 20 with it, the effects of which are described below.

One of the arms 22 of the inverted U-shaped bracket 20 is extended downwardly and provided at its free end with a laterally projecting pin 28 best shown in Figs. 1 and 2. Fitting loosely over pin 28 is the hooked end 29 of a lever 30. The hooked end 29 is so shaped that lost motion is afforded between bracket 20 and lever 30, but only in one direction. Assuming for the moment that lever 30 is fixed, the lost motion connection 28, 29 will permit movement of the bracket 20 in the right hand or counterclockwise direction about its pivot shaft 18 as seen in Fig. 2.

The opposite end of lever 30 is provided with an elongated keyhole slot 31 into which fits the crank pin 33 extending laterally from the shaft 34 journalled in the bracket 11' carrying handset cradle 11, as shown especially in Figs. 1 and 2. By reason of the elongated keyhole slot 31, movement of the crank pin 33 to the left, or in a counterclockwise direction, as in Fig. 2, does not affect the longitudinal position of lever 30, whereas movement of the crank pin 33 toward the right, or in a clockwise direction as seen in Fig. 2, moves lever 30 to the right. Such right hand movement of lever 30 swings bracket 20 in a right hand or counterclockwise direction about its pivot shaft 18 as seen in Fig. 2, to thereby push links 25 toward the corresponding switch banks 14 and release their switch latch bars 16.

Movement of the lever 30 to the right in Fig. 2 by clockwise rotation of crank pin 33 can be effected by replacement of handset 12 in its cradle 11. To that end, the shaft 34 within handset cradle bracket 11' can be provided with a lever 35 against which the depending end 36 of the push pin 37 of the handset reacts. The push pin 37 is urged upwardly by spring 38 when handset 12 is raised from cradle 11. As handset 12 is replaced in cradle 11, push pin 37 is depressed to rotate shaft 34 and crank pin 33 in a clockwise direction to move lever 30 to the right and rotate bracket 20 in a counterclockwise direction as seen in Fig. 2.

In the event it is desired to have the release mechanism operate independently of the handset 12, the arrangement of Fig. 6 can be used. In that arrangement a hand operated release bar 39 is hinged at 40 to a fixed bracket 41 and urged upwardly by a spring 42. The bar 39 is connected by a link 43 to a bell crank linkage 44, the free end of one crank arm 45 of which is received in a slot 46 in the connecting link 43, and the crank arm 47 of which is pivotally connected through the pin 33' to the lever 30', the latter two elements being substantially the same as the pin 33 and lever 30 described above in connection with Figs. 1 and 2. By pressing down on the bar 39 the bracket 20 is rotated to release all of the switches which might have been closed. This arrangement is most suited for executive phones in which multiple calls are contemplated.

Formed at the end of each of the latch bars 16 remote from the swinging bracket 20 is a relay actuating cam 48 adapted to engage a control lever 49 for a relay R. In a single call staff telephone in which privacy and non-interruption of existing calls is required, the cam 48 becomes an integral part of the interlocking key operation to insure privacy by releasing the mechanically locked lockout relay R.

Operation of the gang switching mechanism of this invention will be readily understood from the foregoing description, but a description of a typical multiple call-initiating operation will be helpful to an understanding of the advantages of the invention. Assuming that an executive wishes to communicate simultaneously with the numerous department heads under his jurisdiction, he depresses the switch buttons B corresponding to the remote stations he wishes to call. Any movement which might be imparted to bracket 20, first to the right and then back to the left, as seen in Fig. 2, or vice versa, as seen in Fig. 3, is permitted by the lost motion connection 28, 29. If the arrangement of Fig. 5 is used, the bracket 20 will not move when the switch buttons B are depressed. It is immaterial at this point whether the calling party has removed the handset 12 from its cradle 11 (in the event a handset actuated linkage is used), because the elongated slot 31, affording the lost motion connection between lever 30 and crank pin 33, enables the latter to lie in either position in which it is placed by the downward or upward movement of handset push pin 37.

Having delivered the message to one or more selected remote substations in the manner described, the calling master or executive station user replaces handset 12 in its cradle 11 and presses the release bar 39 so that bracket 20 is swung about its pivot shaft 18 in a counterclockwise direction as seen in Fig. 2, to cause links 25 and pusher heads 26' to push the corresponding switch latch bars 16 inwardly to the right, as seen in Fig. 2, or to the left as seen in Fig. 3, to thereby release and restore all switches simultaneously to the open position. Alternatively, in the event the handset operated release is used, the placing of the handset in the cradle accomplishes the same result.

It will have been observed that not only is a swinging movement imparted to bracket 20 about its pivot shaft 18, but that rod 23 also rotates through a limited angular degree about its axis as the bracket 20 swings, because the angular positions of the latch bars 16 are fixed as is the connection of hooks 26 therewith. Also, the adjustment as to effective length of the links 25 that is afforded by the nuts 27 as well as the angular variation between the several links 25 and the rod 23 that is afforded by the oversize holes 24, enables changes to be made easily at any time to place all banks 14 of any executive or master station in condition for connecting virtually any number of receiving or substations in simultaneous communication. At the same time, the multi-call provision afforded by the present invention does not impair the normal single call operation of the system, because a single switch 13 operation is the same as that involving a plurality of switches 13 in the manner described.

By utilization of the arrangement of Figs. 5 and 6, each subsequent depression of an additional switch 13 does not release the previously closed switches. Thus the calling station may remain in a position for subsequent multi-call service without making it necessary to re-close the selected switches 13 for that purpose. In the arrangement of Figs. 1, 2 and 3, however, it will be seen that to depress switch 13 will cause all other depressed or closed switches 13, whether they be in the same or a separate bank 14 to be released. More particularly, upon operation of any switch 13, a latch bar 16 will be cammed to the left (as viewed in Fig. 3) which will impart movement to the bracket 20 via the tie rods 25 and hence cause all other latch bars 16 to be moved to the left to release their switches.

Although a preferred embodiment of the invention has been illustrated and described herein, it is to be understood that the invention is not limited thereby, but is susceptible of changes in form and detail within the scope of the appended claims.

We claim:

1. In an intercommunicating telephone system having at least one calling station provided with a plurality of switches corresponding to a plurality of remote called stations, the combination of several latch means for simultaneously holding at least two of said switches in closed calling position, common mechanism for releasing said several latch means, said common mechanism including a member pivotally mounted adjacent said several latch means, and means for swinging said member about its pivot for simultaneously releasing said several latch means to restore said closed switches to open position.

2. In an intercommunicating telephone system having at least one calling station provided with a plurality of switches corresponding to a plurality of remote called stations, the combination of several latch means for simultaneously holding at least two of said switches in closed calling position, common mechanism for releasing said several latch means, said common mechanism including a pivoted member, adjustable links on said member adjacent said several latch means, and means for swinging said member about its pivot for simultaneously releasing said several latch means by said links to restore said closed switches to open position.

3. In an intercommunicating telephone system having at least one calling station provided with a frame, a plurality of switches corresponding to a plurality of remote called stations, a telephone instrument and a support, the combination of several latch means for simultaneously holding at least two of said switches in closed calling position, a bracket pivoted on said frame for swinging movement, operative connections between said bracket and said several latch means, an element responsive to the engagement of said telephone instrument therewith, and operative connections between said element and said bracket for simultaneously releasing said latch means upon engagement of the telephone instrument with said element.

4. In an intercommunicating telephone system having at least one calling station provided with a frame, a plurality of switches corresponding to a plurality of remote called stations, the combination of several latch means for holding switches in closed calling position, first operative connections between the switches and latch means affording movement of a latch means upon the closing of a switch, a bracket pivoted on said frame for swinging movement, and operative connections between said bracket and said several latch means affording swinging movement of said bracket in response to movement of the latch means in response to closing of said switches, whereby the closing of any one switch will release all closed switches.

5. In an intercommunicating telephone system as set forth in claim 4, including a telephone instrument and a support, an element responsive to the engagment of said telephone instrument therewith, operative connections between said element and said bracket for simultaneously releasing said latch means upon engagement of the telephone instrument with said element, and lost motion means in said last-named connection affording movement of said element in one direction independently of said bracket.

6. In an intercommunicating telephone system as set forth in claim 2, including lost motion means in said common mechanism between the pivoted member and the latch means affording movement of said pivoted member in one direction independently of said latch means.

7. In an intercommunicating telephone system having at least one calling station provided with a frame, a plurality of switches corresponding to a plurality of remote called stations, the combination of several latch means for simultaneously holding at least two of said switches in closed calling position, a bracket pivoted on said frame for swinging movement, operative first connections between said bracket and said several latch means, a release member, operative second connections between said member and said bracket for simultaneously releasing said latch means upon operation of the release member, lost motion means in said first connections affording movement of said bracket in one direction independently of said latch means, and second lost motion means in said second connections between said bracket and said member affording movement of said bracket in the other direction independently of the release member.

8. In an intercommunicating telephone system having at least one calling station provided with a frame, a plurality of switches corresponding to a plurality of remote called stations, a telephone instrument and a support therefor, the combination of a plurality of latch means corresponding to said plurality of switches for holding the latter in manually closed calling position, a bracket pivoted on said frame for swinging movement, links respectively connecting said latch means to said bracket, adjustable means in said links for varying the effective lengths thereof, means on said support responsive to the engagement of said instrument therewith, and operative connections between said responsive means and said bracket for swinging the latter to cause said links to release the corresponding latch means upon engagement of the instrument with said responsive means.

9. In an intercommunicating telephone system having at least one calling stations provided with a frame, a plurality of switches corresponding to a plurality of remote called stations, the combination of a plurality of latch means corresponding to said plurality of switches for holding the latter in manually closed calling position, a bracket pivoted on said frame for swinging movement, links respectively connecting at least one of said latch means to said bracket, adjustable means in said links for varying the effective lengths thereof, a movable switch releasing member, and operative connections between said releasing member and said bracket for swinging the latter to cause said links to release the corresponding latch means.

10. In an intercommunicating telephone system having at least one calling station provided with a frame, a plurality of switches corresponding to a plurality of remote called stations, the combination of a plurality of latch means corresponding to said plurality of switches for holding the latter in manually closed calling position, a bracket pivoted on said frame for swinging movement, a rod journalled in said bracket, links connecting said latch means to said rod, a movable switch releasing member, and operative connections between said releasing member and said bracket for swinging the latter to cause said links to release the corresponding latch means.

11. An intercommunicating telephone system as set forth in claim 1, said means for swinging said pivotally mounted member including a movable lever and a pin and slot connection between the lever and the pivotally mounted member affording lost motion.

12. An intercommunicating telephone system as set forth in claim 11, including a crank and a pin and slot connection between the crank and said lever affording lost motion.

13. An intercommunicating telephone system as set forth in claim 12, including links on said pivotally mounted member adjacent said several latch means to actuate the latch means upon pivotal movement of said member.

References Cited in the file of this patent

UNITED STATES PATENTS

| | | |
|---|---|---|
| 790,812 | Archer | May 23, 1905 |
| 982,213 | Koltonski | Jan. 17, 1911 |
| 2,289,513 | Mastney | July 14, 1942 |
| 2,572,503 | Melick | Oct. 23, 1951 |